3,397,744
METHOD AND COMPOSITION FOR FRACTURING PERMEABLE EARTH FORMATIONS
Eugene V. Hort, Easton, Pa., and Carl A. Bergman, Basking Ridge, N.J., assignors to GAF Corporation, a corporation of Delaware
No Drawing. Filed Oct. 28, 1965, Ser. No. 505,452
8 Claims. (Cl. 166—42)

ABSTRACT OF THE DISCLOSURE

A method and composition for fracturing a permeable subsurface earth formation wherein a fracturing agent is pumped into a well bore, said fracturing agent consisting of compositions of catalytically cross-linked polyvinyl pyrrolidone polymers and sand grains.

---

This invention relates to methods and compositions for fracturing permeable subsurface earth formations and more particularly, to fracturing methods employing compositions of catalytically cross-linked polyvinyl pyrrolidone polymers and sand grains.

Hydraulic fracturing compositions have been used extensively to fracture permeable subsurface earth formations so that the production of oil or gas from the fractured formations may be increased or initiated. Fracturing is accomplished by pumping a hydraulic fluid into the well bore and applying pressure on the fluid so that compressive and tensile forces are created on the periphery of the borehole. When these forces become sufficiently great, they force the rock apart and start splits in the rock which are lengthened by the pressurized fluid being forced into the splits from the borehole. Compositions which are useful as fluids for hydraulic fracturing of subsurface formations should have specific characteristics. For example, the compositions should be sufficiently fluid that they can be handled in conventional well completion equipment and pumps. The compositions should have the capacity to hold and carry propping materials such as sand in suspension when the compositions are being pumped down the well and the compositions must be capable of carrying and depositing propping materials in the splits produced in the formations by hydraulic pressure. The compositions should be sufficiently fluid to flow into the splits produced in the formation but should have low filter loss properties so that only a small amount of fluid will be lost into the pores. The compositions should not plug splits or pores in producing formation permanently. Neither should the compositions damage the capacity of the formations to produce oil. The compositions should liquify readily and be easily displaceable from the fractured formation after treatment so that blockage does not occur and production of oil or gas from the fractured formations will be increased or initiated.

An object of the present invention is to provide methods and compositions for fracturing permeable subsurface earth formations so that production of oil, gas or other fluids from the fractured formations is increased or initiated. Another object is to provide new and novel compositions of catalytically cross-linked polyvinyl pyrrolidone polymers and sand which will form temporary gels during the fracturing operation and will liquify after fracturing to permit ready displacement of the liquified gel from the fractured formations so that flow of fluids through the fractured formation is improved. Other objects and advantages of this invention will appear as this description proceeds.

The objects of the present invention are attained by injection of compositions of sand grains, polyvinyl pyrrolidone and suitable amounts of a cross-linking agent for the polyvinyl pyrrolidone into the borehole of a well receiving or producing petroleum, gas or other fluids. The rheological properties of these compositions are such that they can be easily pumped down the borehole by means of conventional oil well completion equipment and pumps and that they can be forced into the permeable formation being treated under pressure so that gelation of the compositions in the treated formation will occur within a reasonable time and the gelled composition under pressure will cause fracturing of the treated formation. After a reasonable period of time in the formation, the gel liquifies leaving the fractures in the formation propped open with sand grains so that the liquified gel can be easily displaced and petroleum, or gass or other fluids can flow through the fractures in the formation. The compositions of this invention are new and novel in that they contain water soluble polymers of polyvinyl pyrrolidone which are capable of carrying suspensions of propping agents such as sand grains and in that these polymers can be catalytically cross-linked at appropriate times to form temporary gels which under hydraulic pressure are useful in fracturing the treated formation and which will liquify within reasonable periods of time after fracturing. These compositions have the added advantage that the physical properties of polyvinyl pyrrolidone polymers cover such a wide range that specific members may be selected which will give compositions having the desired viscosities before and after gelation. These compositions have the further advantages that they are useful as suspending agents for carrying propping agents such as sand, that their viscosities may be adjusted for use in conventional oil field equipment and pumps so that optimum penetration and fracturing of the treated formations are obtained. These compositions also have the advantage that they are prepared in aqueous media so that the gelation process is not adversely affected by dilution of the compositions with water or other fluids present in the formation being treated. They also have the advantage that the gelation or setting time of the compositions may be controlled within sufficiently close limits so that optimum fracturing of the treated formations is accomplished without damaging the fluid producing capacity of the formations. Likewise, the time period required for liquefaction of the compositions after gelation and fracturing may be controlled within narrow limits. These compositions also have the advantage that they are prepared in aqueous media and their use does not create fire hazards. Furthermore, the compositions are non-toxic so their use does not create haxards to personnel handling the compositions. These compositions have the further advantage that they liquify within a reasonable time after gelation and use of special liquefaction steps, methods or agents such as treatment of the gel with acid, use of enzyme forming bacteria or the like are not required. The liquified compositions after gelation have the advantage that they are easily displaced from the fractured formations so that flow of fluids through the treated formations may be increased or initiated within a reasonable time after fracturing.

Polyvinyl pyrrolidone polymers which are useful in this invention are available commercially in a variety of forms, concentrations and molecular weights. Polymers having molecular weights of from 50,000 to 2 million or higher may be used, while those polymers having molecular weights of from 50,000 to 350,000 are usually employed in the practice of the present invention. Methods for the manufacture of these polymers are well known in the art. They may be prepared from N-vinyl-2-pyrrolidone (otherwise referred to as 1-vinyl-2-pyrrolidone) by methods disclosed in U.S. Patent 2,265,450, and 2,335,454. The monomer, N-vinyl-2-pyrrolidone, may be prepared by the N-vinylation of the corresponding lactam at elevated temperatures by the method disclosed in U.S. Patent 2,317,084. The molecular weight of N-vinyl-2-pyrrolidone polymers depends on the degree of polymerization. Usually the degree of polymerization and the relative molecular weights of these polymers are expressed in terms of Fikentscher (K) values. The method for determining these (K) values is described in Modern Plastics vol. 23, No. 3, 157–61, 212, 214, 216, 218 (1945). Polymers of N-vinyl-2-pyrrolidone having (K) values of from about 20 to 150 may be used, while usually about 60 to 90 or their mixtures are used in the practice of this invention.

The concentration of polyvinyl pyrrolidone polymers in aqueous solutions employed in this invention varies from one to 20% by weight with the most common concentrations being from 5 to 10% by weight. However, these concentration ranges are not to be regarded as limitative, since factors such as the molecular weight of the pyrrolidone polymer employed, the viscosity of the polymer solution, the nature of the permeable formation being fractured, the particular catalytic redox cross-linking agents employed and other factors must be taken into consideration in determining the concentration of the polymer solution.

Catalytic redox cross-linking agents useful in the practice of this invention are redox systems, for example, a water soluble catalyst containing an oxidant such as hydrogen peroxide and an inorganic ferrous salt reductant capable of supplying ferrous ions in solution such as ferrous ammonium sulfate, ferrous sulfate copperas, ferrous acetate, ferrous bromide, ferrous chloride, ferrous chloroplatinate, ferrous iodide, ferrous nitrate, ferrous potassium oxalate, ferrous sultrate (siderotilate), ferrous thiocyanate, and ferrous thiosulfate and the like. Redox catalyst systems consisting essentially of the inorganic sulfate reductants and a peroxide polymerization catalyst in a molar ratio of at least two moles of peroxide to one mole of inorganic ferrous reductant are particularly suitable for use in the practice of this invention. Especially good results were obtained with redox catalytic systems containing from 15 to 40% of hydrogen peroxide (percent by weight) based on the polyvinyl pyrrolidone and from 5 to 20% of the ferrous ammonium sulfate and ferrous sulfate copperas reductants (percent by weight) based on the polyvinyl pyrrolidone content of the composition. When ferrous ammonium sulfate concentrations in the range from 5 to 20% based on the weight of polyvinyl pyrrolidone and the hydrogen peroxide concentrations in the range from 10 to 40% based on the weight of polyvinyl pyrrolidone are employed, gelation times of 6 to 140 minutes are obtained. These concentration ranges are based on the activities of the polymers, oxidants, and reductants employed in the compositions. However, it is to be understood that these concentrations, percentages and ratios are not to be regarded as restrictive.

The temperature of the instant process is not critical, since gelation may be effected at temperatures ranging anywhere around room temperature up to around and about 90° C. When the applications of these findings are considered for elevated temperatures, for example at 50° C. (122° F.), the catalyst range is more critical; for example the ferrous salt concentration must be in the range of 8% to less than 20% on the PVP for practical gelation times followed by liquefaction times.

Although chemically pure materials may be used in the compositions employed in this process, their use is normally not necessary and commercial materials are used unless unusual conditions are encountered where commercial products do not give satisfactory results.

Compositions for use in this invention are evaluated in the laboratory by placing a known concentration of polyvinyl pyrrolidone polymer solution into a 4 ounce screw-cap bottle and adding the desired amount of peroxide in the form of 30% hydrogen peroxide solution. The polymer and peroxide are mixed and the desired amount of 10% ferrous ammonium sulfate solution is added. The bottle is capped and the contents shaken to mix the ingredients. Timing of the reaction is started immediately and continued until gelation occurs. Some thickening may be observed on addition of the ferrous ammonium sulfate solution. This thickening may be minimized if desired by dilution of the polyvinyl pyrrolidone solution prior to addition of redox chemicals as the initial thickening does not represent gelation.

The following examples are illustrative of the present invention and not to be regarded as limitative. It is to be understood that all parts, percentages and proportions referred to herein and in the appended claims are by weight unless otherwise indicated.

Example I

The following five experiments designated as $(a)$, $(b)$, $(c)$, $(d)$, and $(e)$ demonstrate the range of times required to gel the compositions and to liquify the gels. The compositions are prepared by placing the amounts indicated in Table I of 10% by weight of PVP (Polyvinyl pyrrolidone) solution having a molecular weight of 150,000 and a Fikentscher (K) value of 60 in 4 ounce screw-cap bottle. The indicated amount of peroxide as 30% hydrogen peroxide solution and of 10% ferrous ammonium sulfate solution are then added to the polymer solution. The composition is mixed, capped, and shaken. The time required for the gel is then measured. After gelation, the time required for liquefaction is measured. Results of these experiments are shown in Table I. This data shows that 10% solutions of PVP are useful in this application. It also shows that solutions containing from 10 to 20% ferrous ammonium sulfate by weight based on the PVP concentration give gel times of 11 to 35 minutes at ambient temperatures. The data also shows that dilution of the system increases the time required for gelation.

TABLE I.—PARTS ADDED (G. OF 100% MATERIAL)

| Components | $(a)$ | $(b)$ | $(c)$ | $(d)$ | $(e)$ |
|---|---|---|---|---|---|
| 10% PVP K-60 | 5 | 5 | 5 | 5 | 2.5 |
| 30% $H_2O_2$ | 0.5 | 1.0 | 1.0 | 1.0 | 2.0 |
| 5% $Fe(NH_4)_2(SO_4)_2 \cdot 6H_2O$ | 0.25 | 1.0 | 1.0 | 2.0 | 0.25 |
| Additional $H_2O$ to dilute (cc.) | | | 50 | 50 | |
| Percent Ferrous salt based on wt. of PVP | (5) | (20) | (20) | (40) | (10) |
| Time to gel (mins.) | >960 | 11 | 25 | 18 | 35 |
| Gel stability (mins.) | (¹) | Liquify >960 | | | ² 240 |

¹ Stable gel.
² Liquifies.

Example IA

To illustrate the kinetics of this reaction at higher temperatures, such as could conceivably be encountered down hole in deep wells, the following examples were run at 50° C. (122° F.).

The capped bottles with the PVP solution were warmed at 50° C., the redox catalyst added, and the bottles replaced, capped, in the oven. Observations were made as to the time to a fixed gel and to liquify. Data is as follows:

TABLE IA.—PARTS ADDED (G. OF 100% MATERIAL)

| Components | (a) | (b) | (c) | (d) | (e) | (f) | (g) |
|---|---|---|---|---|---|---|---|
| 5% PVP K-90 | 2.5 | 2.5 | 2.5 | 2.5 | 2.5 | 2.5 | 2.5 |
| 30% $H_2O_2$ | 0.10 | 0.20 | 0.25 | 0.30 | 0.40 | 0.50 | 1.0 |
| 10% $Fe(NH_4)_2.(SO_4)_2.6H_2O$ | 0.05 | 0.10 | 0.125 | 0.15 | 0.20 | 0.25 | 0.5 |
| Percent Ferrous salt based on wt. of PVP | 2 | 4 | 5 | 6 | 8 | 10 | 20 |
| Time to gel (mins.) | 145 | 103 | 54 | 44 | 19 | 4 | 0 |
| Mins. to liquify | α | α | α | α | 180 | 77 | 24 |

Example II

The procedure described in Example I is used to prepare compositions containing 5% solutions of PVP solutions having a molecular weight of 350,000 and a Fikentscher (K) value of 90. Results of these experiments which are demonstrated as (a), (b), (c,) (d), and (e) are shown in Table II. These experiments are similar to those in Example I with the exception that technical ferrous sulfate $FeSO_4 \cdot 7H_2O$ (copperas) is used instead of ferrous ammonium sulfate. These experiments shown that when copperas is used instead of ferrous ammonium sulfate that copperas promotes faster gelation. This data also shows that 5 to 20% of ferrous ammonium sulfate based on the weight of PVP in the composition results in variation of the gelation time from 8 to 137 minutes. The data also shows that gel liquefaction times range from 2 to 4 hours.

TABLE II.—PARTS ADDED (G. OF 100% MATERIAL)

| Components | (a) | (b) | (c) | (d) | (e) |
|---|---|---|---|---|---|
| PVP K 90, 5% solution | 2.5 | 2.5 | 2.5 | 2.5 | 2.5 |
| 30% $H_2O_2$ | 0.5 | 0.3 | 0.5 | 1.1 | 0.7 |
| $FeSO_4.7H_2O$, technical, 10% solution | 0.25 | | | | |
| $Fe(NH_4)_2.(SO_4)_2.6H_2O$, 10% solution | | 0.12 | 0.25 | 0.5 | 0.35 |
| Time to form stable gel (mins.) | 10 | 137 | 65 | 8 | 17 |
| Time to liquify gel (mins.) | 180 | 240 | 129 | 128 | 130 |
| Percent ferrous salt based on wt. of PVP | (10) | (5) | (10) | (20) | (14) |

Example III

In a well which is producing more barrels of water per day than barrels of oil per day the following procedure may be adopted for improving the amount of oil production by using various stock compositions from about 0.1% to 1.0% PVP K-60 to K-90.

Said stock compositions may be prepared by mixing 150 to 1500 pounds of PVP with 300 to 3000 pounds of $H_2O_2$ in 300 to 3000 pounds of $Fe(NH_4)_2 \cdot (SO_4)_2 \cdot 6H_2O$ or 15 to 150 pounds of the iron salt.

The treatment of the well proceeds as follows:

Approximately 100 barrels (4200 gallons) of water are pumped into the well which results in the pressure at the well head of about 1400 p.s.i., and produces an initial breakdown of the formation as indicated by a drop in pressure of about 200 p.s.i. Then 425 barrels (17,850 gallons) of water are pumped into the well while a 150 pound mixture of the above prepared 0.1% stock solution and 15,000 pounds of sand are simultaneously fed into a blender and the resulting mixture fed into a water line leading into the well at a rate of 84 pounds of mixture per 1000 gallons of water, which requires about 25 minutes of time. During this period the pressure undergoes several succesive, abrupt drops resulting in a final reading of approximately 900 p.s.i.

The well is flushed out by pumping approximately 175 barrels (7,350 gallons) of water into the well and releasing the pressure to allow the fluids to flow back out of the well. Upon putting the well back into production, the average number of barrels of oil per day is substantially increased.

Various modifications and variations of this invention will be obvious to a worker skilled in the art and it is understood that such modifications and variations are to be included within the purview of this application and the spirit and scope of the appended claims.

We claim:

1. In a method of fracturing a permeable subsurface earth formation wherein a fracturing agent is pumped into a well bore and pressure sufficient to fracture said formation is applied to said agent, the improvement which comprises using as the fracturing agent an aqueous composition comprising a mixture consisting of (1) a 1 to 20% aqueous solution of polyvinyl pyrrolidone polymer having a Kikentscher K value of 20 to 150 and (2) a catalytic amount of a redox catalyst system consisting essentially of an inorganic ferrous salt and a peroxide polymerization catalyst in a molar ratio of at least two moles of peroxide to one mole of reductant.

2. The improvement according to claim 1 wherein the inorganic ferrous salt is a reductant selected from the group consisting of ferrous ammonium sulfate and ferrous sulfate copperas.

3. The improvement according to claim 1, wherein the polyvinyl pyrrolidone polymer has a Fikentscher K value of 60 to 90.

4. The improvement according to claim 1, wherein the mixture consists of a 5 to 10% by weight aqueous solution of polyvinyl pyrrolidone polymer having a Fikentscher K value of 60 to 90.

5. The improvement according to claim 1, wherein the redox catalyst system consists essentially of an inorganic ferrous salt reductant of 5 to 20% based on the weight of said polyvinyl pyrrolidone polymer and selected from the group consisting of ferrous ammonium sulfate and ferrous sulfate copperas, and hydrogen peroxide of 15% to 40% based on the weight of said polyvinyl pyrrolidone polymer.

6. In a method of fracturing a permeable subsurface earth formation wherein a fracturing agent is pumped into a well bore and pressure sufficient to fracture said formation is applied to said agent, the improvement which comprises using as said fracturing agent an aqueous composition comprising a mixture consisting of (1) 10% aqueous solution of polyvinyl pyrrolidone polymer having a Fikentscher K value of 60 and (2) a catalytic amount of a redox catalyst system consisting essentially of $Fe(NH_4)_2.(SO_4)_2.6H_2O$ reductant of 5% based on the weight of said polyvinyl pyrrolidone polymer and hydrogen peroxide of 30% based on the weight of said polyvinyl pyrrolidone polymer.

7. In a method of fracturing a permeable subsurface earth formation wherein a fracturing agent is pumped into a well bore and pressure sufficient to fracture said formation is applied to said agent, the improvement which comprises using as said fracturing agent an aqueous composition comprising a mixture consisting of (1) 5% aqueous solution of polyvinyl pyrrolidone polymer having a Fikentscher K value of 90 and (2) a catalytic amount of a redox catalyst system consisting essentially of $FeSO_4$—$7H_2O$ (copperas) reductant of 10% based on the weight of said polyvinyl pyrrolidone polymer and hydrogen peroxide of 30% based on the weight of said polyvinyl pyrrolidone polymer.

8. In a method of fracturing a permeable subsurface earth formation wherein a fracturing agent is pumped into a well bore and pressure sufficient to fracture said formation is applied to said agent, the improvement which comprises using as said fracturing agent an aqueous composition comprising a mixture consisting of (1) 10% aqueous solution of polyvinyl pyrrolidone polymer having a Fikentscher K value of 90 and (2) a catalytic amount of a redox catalyst system consisting essentially of $Fe(NH_4)_2.(SO_4)_2.6H_2O$ reductant of 5% based on the weight of said polyvinyl pyrrolidone polymer and hydrogen peroxide of 30% based on the weight of said polyvinyl pyrrolidone polymer.

References Cited

UNITED STATES PATENTS

| | | | |
|---|---|---|---|
| 2,508,341 | 5/1950 | Wilson | 260—63 X |
| 2,658,045 | 11/1953 | Schildknecht. | |
| 2,810,716 | 10/1957 | Markus | 260—88.1 |
| 2,927,913 | 3/1960 | Grosser | 260—88.3 |
| 3,235,490 | 2/1966 | Goren | 260—88.3 X |
| 3,252,904 | 5/1966 | Carpenter | 166—42 X |
| 3,302,717 | 2/1967 | West et al. | 166—42 X |

CHARLES E. O'CONNELL, *Primary Examiner.*

I. A. CALVERT, *Assistant Examiner.*